United States Patent
Myers et al.

(10) Patent No.: US 6,826,205 B1
(45) Date of Patent: Nov. 30, 2004

(54) ETALON ENHANCED SATURABLE REFLECTOR FOR MODE-LOCKED LASERS

(75) Inventors: Lawrence E. Myers, Palo Alto, CA (US); Jason I. Alexander, Foster City, CA (US)

(73) Assignee: Lightwave Electronics Corporation, Mountain View, CA (US)

( * ) Notice: Subject to any disclaimer, the term of this patent is extended or adjusted under 35 U.S.C. 154(b) by 0 days.

(21) Appl. No.: 09/576,171

(22) Filed: May 22, 2000

(51) Int. Cl.[7] .......................... H01S 3/098; H01S 3/10; H01S 3/08
(52) U.S. Cl. ............................ 372/18; 372/11; 372/20; 372/99
(58) Field of Search .............................. 372/18, 11, 98, 372/99

(56) References Cited

U.S. PATENT DOCUMENTS

| | | | |
|---|---|---|---|
| 5,237,577 A | 8/1993 | Keller et al. ................. 372/11 |
| 5,303,256 A * | 4/1994 | Sumida ....................... 372/106 |
| 5,502,737 A * | 3/1996 | Chartier et al. ............... 372/11 |
| 5,627,854 A | 5/1997 | Knox .......................... 372/99 |
| 5,701,327 A * | 12/1997 | Cunningham et al. ......... 372/99 |
| 5,848,079 A * | 12/1998 | Kortz et al. .................. 372/22 |
| 5,901,162 A | 5/1999 | Alcock et al. ................ 372/18 |
| 5,933,442 A * | 8/1999 | Sawano et al. ............... 372/45 |
| 5,956,354 A * | 9/1999 | Yan ............................ 372/18 |
| 6,141,359 A * | 10/2000 | Cunningham et al. ........ 372/18 |
| 6,252,892 B1 * | 6/2001 | Jiang et al. .................. 372/11 |
| 6,256,434 B1 * | 7/2001 | Matuschek et al. ........... 385/37 |
| 6,393,035 B1 * | 5/2002 | Weingarten et al. .......... 372/18 |

OTHER PUBLICATIONS

U. Keller et al., Solid–state low—loss intracavity saturable absorber for Nd:YLF lasers: an antiresonant semiconductor fabry–Perot saturable absorber, Apr. 1, 1992 / vol. 17, No. 7 / Optics Letters.

Ursula Keller et al., Semiconductor saturable absorber mirrors (SESAM's) for femtosecond to nanosecond pulse generation in solid–state laser, IEEE Journal of Selected Topics in Quantum Electronics, vol. 2, No. 3, Sep. 1996.

I. P. Bilinsky et al., "Semiconductor–doped–silica saturable–absorber films for solid–state laser mode locking", Optics Letters/ vol. 23, No. 22/ Nov. 15, 1998.

C.J. Howle et al, "Proceedings of CLEO", Optical Society of America , 1998, pp. 161–162.

* cited by examiner

Primary Examiner—Minsun Oh Harvey
Assistant Examiner—James Menefee
(74) Attorney, Agent, or Firm—Lumen Intellectual Property Services, Inc.

(57) ABSTRACT

A Saturable Reflector apparatus comprises a substrate having a first and second surfaces, and a reflector having a saturable absorber layer, attached to the first surface. At least one of the first and second surfaces has been modified to enhance an etalon effect of the substrate due to interference of light reflecting from the first and second surfaces. Either or both of the surfaces may be modified, for example, by polishing or coating. The apparatus may also include means for adjusting an optical thickness of the substrate to tune the etalon effect. Such means may comprise a temperature control element, such as a heater, coupled to a temperature controller. The inventive apparatus may be incorporated into a mode-locked laser. The etalon tuning optimizes a relation between temporal and frequency domains of radiation incident on the saturable reflector.

35 Claims, 6 Drawing Sheets

Autocorrelation 38 ps FWHM (sech²)

Optical spectrum 26.8 GHz FWHM

Autocorrelation 67 ps FWHM (sech²)

Optical spectrum 10.0 GHz FWHM

ETALON ENHANCED SATURABLE REFLECTOR FOR MODE-LOCKED LASERS

This invention was supported in part by grant number CA73368-03 from the National Institutes of Health. The Government has certain rights in the invention.

FIELD OF THE INVENTION

This invention relates generally to mode-locked lasers. More particularly, it relates to enhancement of saturable Bragg reflectors (SBRs) using a back side of the SBR substrate.

BACKGROUND ART

The type of passive mode-locker that has had the greatest recent impact is based on saturable absorption in semiconductor films. One type of saturable absorber device is know as a saturable Bragg reflector (SBR). An SBR generally comprises a Bragg stack disposed on a substrate. The Bragg stack typically contains alternating layers of narrow bandgap, e.g. Gallium Arsenide (GaAs), and wide bandgap, e.g. Aluminum Arsenide (AlAs), layers with a saturable absorber layer inserted in one of the narrow bandgap layers. The layers are usually deposited by metallo-organic chemical vapor deposition (MOCVD) or molecular beam epitaxy (MBE). An alternative to semiconductor saturable absorbers formed by epitaxial growth (MOCVD, MBE) is to use films formed by simpler deposition methods (sputter, evaporation) that are commonly used for coating optical components. [Bilinsky, 1998] This approach is much less well developed at this time compared to the semiconductor material. The reflection characteristics of the SBR generally depend on the wavelength of the incident radiation. The saturable layer modifies the reflection characteristics of the SBR near a characteristic exciton wavelength. The absorber layer within the Bragg stack provides a non-linear reflectance as a function of fluence. The reflectance of such a stack tends to increase with increasing fluence and saturates as the fluence rises above a predetermined level. The reflectance is affected by an exciton effect of the saturable layer. This effect may be tuned, e.g. by changing the temperature of the substrate. Saturable Bragg Reflectors are described in detail in U.S. Pat. No. 5,627,854 issued to Wayne Knox, which is incorporated herein by reference.

SBRs provide a nonlinear saturation response for mode-locking lasers. A mode-locked laser typically comprises a lasing medium such as Nd:YAG disposed in an optical cavity. A pump source, such as a diode laser pumps the lasing medium to produce stimulated emission of light. An SBR typically serves as one of the reflectors for the laser cavity. Optical pulses produced by the laser tend to have higher fluence and, therefore, lower loss at the SBR. Consequently, such a laser tends to favor pulse formation at high fluence.

The properties of the substrate of the SBR affect the performance of the laser. For example if the substrate transmits light, some light may reflect off both the front and back surfaces. Light reflecting from the back surface produces feedback that interferes with light reflecting from the front surface and affects the performance of the SBR and mode-locked laser. Such interference effects have either been ignored in the prior art, because the front surface is much more reflective than the back surface, or viewed as detrimental to laser operation. Sometimes, SBRs are manufactured with substrates having polished back surfaces. Where the effect was not negligible, the prior art removed the effect by sanding the back surface to roughen it, thereby making it less reflective. The effect has also been observed to depend on the type of glue or solder used to attach the substrate to a supporting plate.

The pulses produced by a laser may be altered using an etalon. Etalons have been previously used to control the spectrum in mode-locked lasers. An etalon uses two parallel reflecting surfaces separated by a known distance. Interference of light reflected or transmitted from the two surfaces reinforces certain wavelengths of light, while tending to cancel out others. It is well known to use an etalon to affect the spectrum of a laser to lengthen or shorten optical pulses in a mode-locked laser. Alternatively the etalon may be used to optimize the relation between the temporal and frequency domains of the laser spectrum or adjust the distribution of power amongst the various modes of the laser. Prior art etalons have been separate discrete elements. Consequently, these etalons are difficult to implement in a mode-locked laser because they are difficult to align properly. Etalons must generally be temperature and vibration stable. In short, an etalon usually adds to the complexity of construction and cost of a mode-locked laser.

A variety of passive mode-lockers based on film technology have been developed or proposed recently. These are classified in the literature as saturable Bragg reflectors (SBR), semiconductor saturable absorbing mirrors (SESAM), anti-resonant Fabry-Perot saturable absorbers (AFPSA), and hybrid saturable reflectors. AFPSA's were the first devices to use nonlinear semiconductor saturable absorption as a passive mode-locking technique. [Keller, 1992, Keller, 1996, Keller, 1993] An AFPSA device has a substrate upon which is applied a Bragg mirror stack, a saturable absorber in a buffer layer, and a surface coating. The thickness of the buffer layer is designed for anti-resonance. The surface coating is typically a partial reflector to control the field intensity in the absorber region, although variants include an anti-reflection coating or no coating at all in which case the surface reflectivity was determined by the Fresnel reflectivity of the interface.

A hybrid saturable reflector consists of a substrate with an absorbing layer grown on the back surface (rather than on the top surface), then covered by a dielectric or metal mirror. [Alcock, 1999] In this approach the laser field passes through the substrate but the interaction is benign so the only purpose of the substrate is to support the saturable absorber and mirror structure. No etalon effect is employed; in fact, the front surface of the substrate is AR coated to avoid any possibility of etalon effect. Alternatively the front surface could be left uncoated or coated with a partial reflector to introduce etalon effects.

There is a need, therefore, for a low cost, simple, tunable, mode-locked laser having a saturable reflector that incorporates an etalon to control the laser spectrum.

OBJECTS AND ADVANTAGES

Accordingly, it is a primary object of the present invention to provide a saturable Bragg reflector having integral etalon tuning. It is a further object of the invention to provide a mode-locked laser with low cost, reduced complexity, and improved performance.

SUMMARY

These objects and advantages are attained by a Saturable Bragg Reflector apparatus comprising a substrate having a front surface and a back surface, and a Bragg stack, having a saturable absorber layer, attached to the front surface. At least one of the front and back surfaces has been modified to enhance an etalon effect due to interference of light reflecting from the front and back surfaces. Either or both of the surfaces may be modified, for example, by polishing or coating. The apparatus may also include means for adjusting an optical thickness of the substrate to tune the etalon effect. Such means may comprise a temperature control element, such as a heater, coupled to a temperature controller. The inventive apparatus may be incorporated into a mode-locked laser. Tuning the substrate etalon effect implements an inventive method for tuning a saturable reflector. The etalon tuning optimizes a relation between temporal and frequency domains of radiation incident on the SBR.

In embodiments of the present invention, the SBR device is monolithically integrated with a Fabry-Perot etalon fabricated in the same substrate. A temperature control circuit tunes and stabilizes the device operating point. It is the interaction of the etalon modes with the laser spectrum and the saturable absorber temperature which causes changes to the pulse width. The etalon typically has a free spectral range (FSR) of order 1 GHz or greater. The etalon thickness is generally large enough to give an FSR on order of the laser linewidth.

A specific embodiment of the invention comprises a device having a GaAs wafer substrate with structures on the front and back surfaces. On the front surface is a saturable Bragg reflector, consisting of a Bragg reflector stack and a quantum-well nonlinear absorption layer. On the back surface is a reflector, which forms an etalon with the substrate and Bragg reflector. Thus the device integrates a passive mode-locker with an etalon which modifies the spectral content of the light to alter the pulse length produced by the mode-locked laser. In particular, the device is used to build a mode-locked laser with a flattened gain spectrum by suppressing the gain peak, thereby increasing the bandwidth and shortening the pulse length.

DETAILED DESCRIPTION

1. INTRODUCTION

Figure 1A:
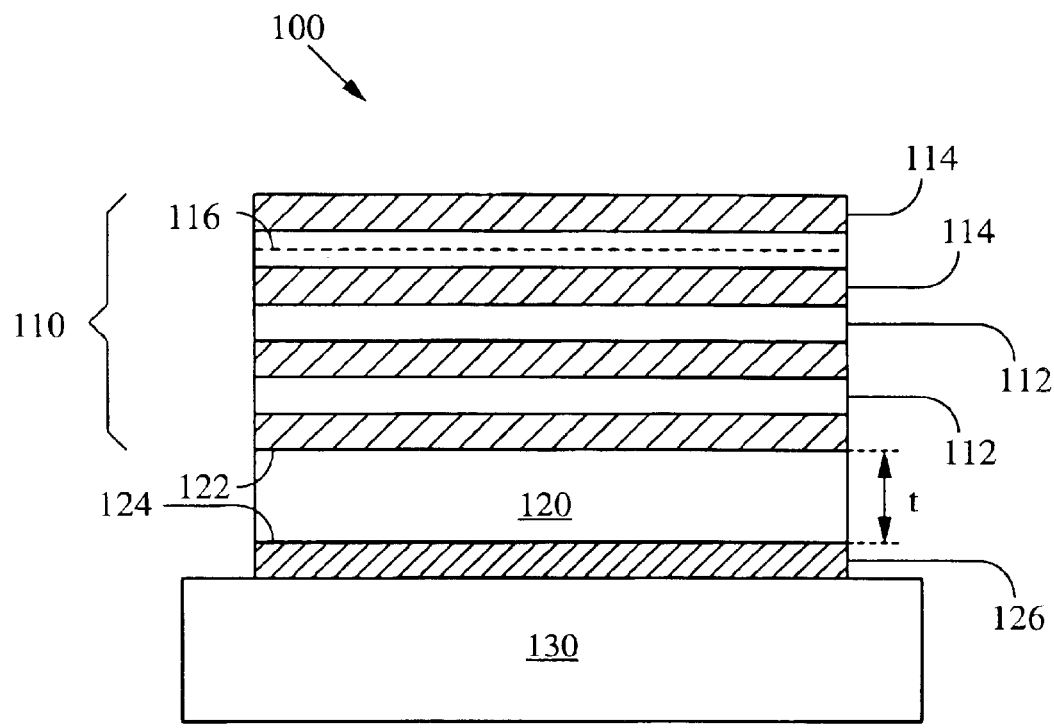
FIG. 1A depicts a saturable Bragg reflector to a first embodiment of the present invention.

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

Embodiments of the present invention integrate a passive mode-locker and an etalon for spectral shaping into a single monolithic device. In prior art mode-locker devices, the substrate is a benign element that serves only to support the mode-locker structure. In the embodiments of the present invention, the substrate is a key part of the device and serves to form an etalon that controls the spectral shape in laser operation. In embodiments of the present invention, the etalon is integrated with the mode-locker itself.

In embodiments of the present invention, the etalon is used for a different purpose and has a different construction than the anti-resonant etalon of the AFPSA of the prior art. Furthermore, the etalon in embodiments of the present invention does not contain a saturable absorber layer. The etalon serves to modify the laser spectrum rather than to control the field intensity in the absorber. The absorber is placed in front of the etalon rather than within it. The etalon is typically operated on-resonance rather than off-resonance.

The invention is an etalon-enhanced passive mode-locker and its use in a mode locked laser. The mode-locker consists of a saturable Bragg reflector (or other passive mode-locker based on film deposition technology) monolithically combined with a Fabry-Perot etalon and using temperature control for stabilization and tuning. The embodiment of this structure that we fabricated consists of a GaAs wafer (referred to as a substrate) with both surfaces polished, as shown in FIG. 1. On one side (called top surface) is grown epitaxial films which form a structure identified in the literature as a saturable Bragg reflector (SBR), consisting of a distributed Bragg reflector (DBR) with the topmost layer containing a quantum-well saturable absorber. The other surface of the substrate (called back surface) has a partial reflectivity which, combined with the substrate interior and the back side of the DBR, form an etalon. The device is mounted on a temperature-regulated surface to control the optical path length of the substrate which affects the etalon free spectral range (i.e. spacing of resonant modes).

The SBR section of this device can include all variants that are known in the literature, e.g. multiple quantum wells, or different placement of quantum wells in the SBR stack, etc. Also different types of structures can be used in place of the SBR, such as the anti-resonant Fabry-Perot saturable absorber (AFPSA), the low-finesse AFPSA, the semiconductor saturable absorber (SESAM), and the hybrid saturable reflectors which are types of devices described in the literature.

2. SATURABLE REFLECTOR APPARATUS

FIG. 1A depicts a Saturable Reflector apparatus according to a first embodiment of the present invention. The apparatus 100 generally comprises a saturable reflector 110 attached to a substrate 120. The apparatus 100 may further include a mounting plate 130 attached to reflector 110 or substrate 120 by any suitable means, such as a solder, glue or mechanical clamp. The saturable reflector includes a saturable absorber layer 116. The reflector 110 may be a metal or dielectric film. Alternatively, the reflector 110 may be a Bragg stack as depicted in FIG. 1A. The Bragg stack 110 typically comprises narrow bandgap layers 112 and wide bandgap layers 114. Narrow bandgap layers 112 are typically made of Gallium Arsenide (GaAs) or some other narrow bandgap semiconductor material. Wide bandgap layers 114 are typically made of Aluminum Arsenide (AlAs). Alternatively, other suitable wide bandgap semiconductor materials such as InGaAs or InP may be used for wide band gap layers 114.

The narrow bandgap layers 112 and wide bandgap layers 114 alternate in the stack 110. The stack typically contains about 5 to 100 layers of each type, typically 30. Each layer has an optical thickness of approximately ¼ of the desired wavelength of operation, e.g. about 0.08 microns thick for GaAs and 1 micron radiation. The stack 110 is typically about 1 micron thick overall. The stack 110 includes a saturable absorber layer 116 in one of the narrow bandgap layers 112. In an exemplary embodiment, the saturable absorber layer 116 is a layer of Indium Gallium Arsenide (InGaAs) approximately 10 nm thick, which forms a quantum well. Alternatively, the saturable layer 116 may include multiple quantum wells of the type described above. The SBR section of this device can include all variants that are known in the literature, e.g. multiple quantum wells, or different placement of quantum wells in the SBR stack, etc. Also different types of structures can be used in place of the SBR, such as the antiresonant Fabry-Perot saturable absorber (AFPSA), the low-finesse AFPSA, the semiconductor saturable absorber (SESAM) and the hybrid saturable reflector which are types of devices described in the literature.

The substrate 120 is typically GaAs about 100 to 1000 microns thick. The substrate has a front surface 122 and a back surface 124. The reflector 110 is typically attached to the front surface 122. The reflector 110 may alternatively be attached to the back surface 124. The front surface 122 and back surface 124 are generally parallel to each other. At least one of the two surfaces is modified to enhance an etalon effect due to light reflecting off the back surface 124 interfering with light reflecting off the front surface 122. The etalon effect depends on the overall reflectivity, which is a combination of the reflectivities of the front surface 122 and the back surface 124.

With respect to substrate 120, the meaning of the terms "front surface" and "back surface" are, of course, dependent upon the direction of incidence of light. For example, if light traveling from top to bottom is incident upon the reflector 110 from the top in FIG. 1A, the surface 122 is the front surface and surface 124 would be the back surface. Alternatively light traveling from bottom to top may be incident upon surface 124 from the bottom. In such a case surface 124 would be the front surface and surface 122 would be the back surface. Both configurations are within the scope of the embodiments of the present invention. Therefore, the terms front surface and back surface may be used interchangeably without loss of generality.

There are several ways in which the surfaces might be modified. For example, the back surface 124 might be polished to enhance Fresnel reflection. Generally, the back surface 124 is polished so that the surface does not deviate locally from flatness by LP more than about ¼ of the wavelength of the radiation incident on it. More preferably, the back surface 124 is polished to within about ⅛ of the wavelength. Alternatively, the substrate 120 may be attached to a support plate (not shown) by an adhesive that affects the reflectivity of the back surface 124. In a preferred embodiment, a reflective coating 126 of dielectric or metallic material is deposited on the back surface 124. Preferably, coating 126 is made from a material that grows well on the substrate 120. Similar modifications may be made to the front surface 122 to adjust the overall reflectance of the substrate 120. Suitable materials for coating 126 include metals such as chrome and dielectrics such as Hafnium Oxide. Those skilled in the art will recognize that the reflectivity of the substrate 120 may also be modified by combinations of two or more of the methods described above and their legal equivalents. The etalon effect may be tuned by adjusting an optical thickness of the substrate 120 between the front and back surfaces. The optical thickness generally depends on the product of a thickness t and an index of refraction n of the substrate 120. The expression for the optical thickness may be more complicated to account for variations of n with location within substrate 120 or with wavelength of incident radiation. The optical thickness may be adjusted by changing t or n or both. For example, changing the temperature of the substrate 120 changes both t and n in a known fashion that depends on the substrate material. Thus, the etalon effect of SBR 100 may be tuned, for example, using a heater or cooler element incorporated into mounting plate 130 and temperature controller.

Alternatively, the substrate 120 may be made of a material that exhibits piezoelectric, electro-optic or magneto-optic effects, so that any one or more of these effects may be used to tune the etalon effect of SBR 100. In the piezoelectric effect, an electric field applied to the material of substrate 120 produces a mechanical strain that alters the physical dimensions of substrate 120, e.g. the thickness t. In the electro-optic effect, an electric field applied to the material of substrate 120 changes the index of refraction n in a known fashion that depends on the electric field. In the magneto-optic effect, a magnetic field applied to the material of substrate 120 changes the index of refraction n in a known fashion that depends on the magnetic field.

Figure 1B:
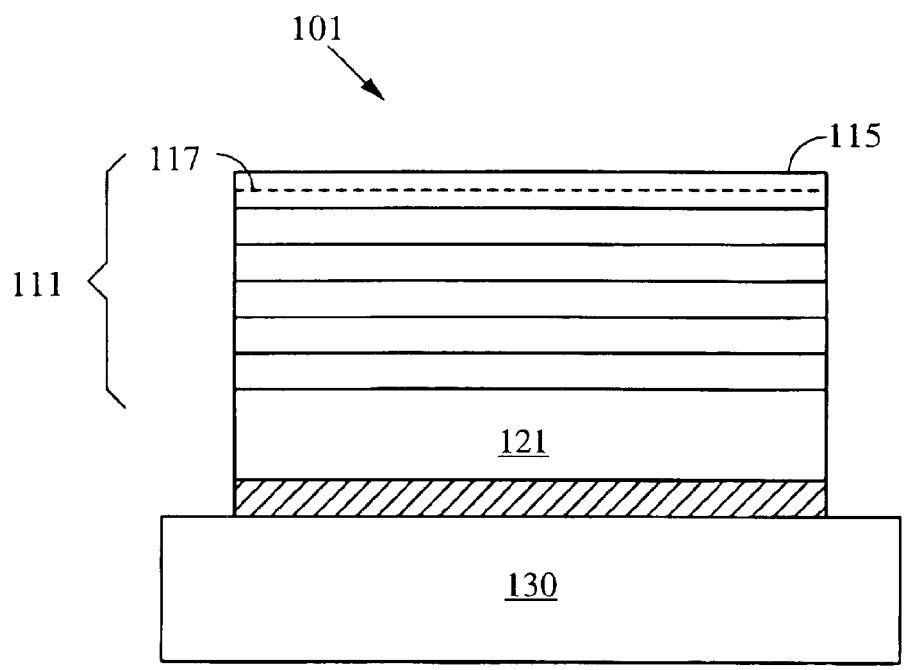
FIG. 1B depicts a saturable Bragg reflector to the prior art.

Thus an etalon tunable optical system may be built from SBRs of the type shown in FIG. 1A with fewer parts and considerably easier alignment than a device using a separate etalon. This reduces the cost and complexity of any optical device that uses the SBR 100 with etalon tuning. It is useful to compare and contrast the first embodiment of the present invention with a prior art mode-locking device that contains an etalon. FIG. 1B depicts a prior art mode locking device 101. The device 101 generally comprises a distributed Bragg reflector (DBR) 111, such as a Bragg stack of the type described above, attached to a substrate 121. An etalon 115 having an absorber layer 117 is attached to the front of the reflector 111. In the prior art device 101 the saturable absorber layer 117 is in between the two reflecting surfaces of the etalon 115. In the apparatus 100 of the first embodiment of the present invention, the saturable layer 116 is outside the etalon. This distinction is not trivial. The prior art etalon 115 is operated off resonance to lower the field strength in the saturable absorber layer 117. The etalon 115 of the prior art implementation of FIG. 1B is also typically spaced in antiresonance, which broadens the bandwidth of the reflectivity.

In the apparatus 100, by contrast, the etalon formed by the surfaces 122 and 124 of the substrate operates to control the resonance location relative to the laser gain peak and laser longitudinal modes. The interaction of this resonance with the gain spectrum is the key to the device operation. The principle is that the lower reflectivity of the etalon-enhanced saturable reflector on-resonance causes increased loss for that portion of the gain spectrum. This has the effect of flattening the gain and effectively increasing the bandwidth leading to shorter pulses. An additional difference is that the prior art etalon 115 is much thinner than the etalon formed by surfaces 122 and 124 of apparatus 100. The prior art etalon 115 is typically about 1 micron thick. Consequently, the fringes are as broad or broader than the typical laser line when the device 101 is used as a mode-locker in a mode-locked laser. The etalon of apparatus 100, by contrast, is typically several hundred microns thick. The etalon typically has a thickness large enough to give it a free spectral range (FSR) of order 1 GHz or greater. For laser applications an FSR of order 1 GHz is of roughly comparable to or less than a typical laser gain spectrum. Multiple fringes may interact with the saturable absorber layer 116 of the apparatus 100, to selectively shape the gain spectrum. In the prior art device 101 only one broad fringe interacts with laser gain and selective shaping of the gain spectrum does not occur.

3. LASER

The inventors have incorporated an etalon tunable SBR of the type described above with respect to FIG. 1A into a mode-locked laser. The laser 200, depicted in FIG. 2, generally comprises an optical cavity 202, a lasing medium 204, and a pump source 206. The laser 200 may optionally include a nonlinear medium 208. The cavity 202 generally comprises two or more mirrors 210A–210C, at least on of which includes an SBR 212 of the type described above with respect to FIG. 1A. SBR 212 includes a Bragg Stack 213, having a saturable layer 215, attached to a substrate 217. Light from the pump source 206 stimulates emission of laser radiation 207 of wavelength λ from the lasing medium 204. Lasing medium 204 may be any medium capable of producing stimulated emission. Such a medium may be in the form of a solid, liquid or gas. Suitable media include doped crystals such as Nd:YAG and Ti:Sapphire, Nd:YLF, Nd:YVO$_4$, Nd:glass, fiber lasers and gases such as CO$_2$ and HeNe.

When the non-linear medium 208 is present, the laser radiation 207 may, for example, interact with the nonlinear medium 208 by a nonlinear parametric amplification effect to produce signal radiation 209 having a wavelength $\lambda_s$ and idler radiation 211 having a wavelength $\lambda_I$. In general, $\lambda_s$, $\lambda_p$ and $\lambda_i$ are related by $$\frac{1}{\lambda_L} = \frac{1}{\lambda_S} + \frac{1}{\lambda_I}. \quad (1)$$

Alternatively, the non linear medium 208 may interact with the pump radiation to produce second harmonic generation (SHG) effect. The nonlinear medium 208 may be in the form of a solid liquid or gas. Typically, the nonlinear medium 208 is a crystal containing a material chosen from the group consisting of Lithium Niobate (LiNbO$_3$), Lithium Tantalate (LiTaO$_3$), Lithium Borate (LiBO$_3$) periodically poled lithium niobate (PPLN), periodically poled lithium tantalate (PPLT) MgO:PPLN, KTP, PPKTP, RTA, BBO, MgO:LN, KTA, and PPRTA. Other suitable nonlinear media include Raman active, Brillouin active, or four-wave mixing media, which can also produce parametric amplification effects that happen to be nonlinear. Alternatively, one could use a span of optical fiber that exhibits Raman gain, Brillouin gain or four-wave mixing as the nonlinear medium 208. The inclusion of the nonlinear medium 208 in the description of laser 200 is for the purpose of example and is in no way intended to limit the scope of the present invention.

Whether or not a non-linear medium is present, the cavity 202 may be any type of cavity structure having two or more mirrors. Suitable structures for the cavity 202 include Fabry-Perot, triangle, ring and bowtie cavities. The mirrors 210A–210C may be flat or curved depending on the cavity design. Usually, one of the mirrors, e.g. 210A, is partially reflecting to that radiation may be coupled in or out of the cavity 202. One or more of the mirrors 210A–210C may be movable so that a path length L, and therefore resonant frequency, of the cavity 202 may be tuned.

At least one of the mirrors, e.g. 210C, includes an SBR 212. The SBR 212 provides a nonlinear saturation response to incident radiation that mode-locks the laser 200. As described above, the SBR 212 generally comprises a substrate having a front and back surfaces, and a Bragg stack, with a saturable absorber layer, attached to the front surface. At least one of the front and back surfaces of the substrate has been modified to enhance an etalon effect. The front or back surface may be modified according to any of the embodiments described above with respect to FIG. 1. Appropriate tuning of the optical thickness of the substrate 210 adjusts the transmission of the cavity 202. The transmission adjustment can affect the length of pulses of radiation emerging from the cavity 202. For example, when the transmission of the cavity 202 has a dip near the center of the spectrum of signal radiation 209, the pulse shortening is greatest.

As described above, the etalon effect may be tuned by adjusting an optical thickness between the front and back surfaces. Adjustment may be accomplished by any suitable means described above with respect to FIG. 1. In a preferred embodiment, a temperature control element 214 thermally coupled to the SBR 212 tunes the etalon effect of the SBR 212. The temperature control element 214 may be any type of device used for radiatively, conductively or convectively transferring heat into or out of the SBR 212. For example, the heater element 214 may be a resistive element Ohmically heated by an electric current. Alternatively, the temperature control element 214 may be a cooling element that cools the SBR 212 by convective fluid flow or Peltier effect. A temperature controller 216 coupled to the temperature control element 214 regulates the amount of heat transferred to or from the SBR 212. Such a temperature controller may operate by a feedback loop to control a power supply 218. The feedback loop operates to optimize a spectrum of the signal radiation 209. The feedback loop may be coupled through an optical sensor that monitors the signal radiation 209 or a temperature sensor that measures the temperature of the substrate 212. Such a feedback loop may be implemented in hardware or software or some combination of both. To tune the etalon effect, it is often desirable to maintain the temperature of substrate 212 to within about ±0.1° C. of a desired target temperature. Prior art temperature tuning of the SBR exciton effect, by contrast, may only require that the substrate temperature be maintained within ±1° C.

4. EXPERIMENTAL RESULTS

A physical example of a specific implementation of the embodiments of the invention illustrates the device operation. A laser incorporating the features described above used an SBR fabricated by Epitaxial Products Inc. (EPIQ9802414 #1) on top of a 0.5 mm thick GaAs wafer substrate polished on both surfaces. The SBR in this example is in the form of a distributed Bragg reflector (DBR). An etalon is formed by the DBR on the top surface and the polished back surface. The free spectral range of the etalon was c/2nL=72 GHz (where n=4.16 is the index of refraction, c is the speed of light, and L is the substrate thickness). The Fresnel reflectivity of the polished back surface is $[(n-1)/(n+1)]^2=37\%$, and the finesse is ≈10, assuming 97% reflectivity of the DBR (finesse=$2\pi/\delta_c$ where $\delta_c$ is the total fractional power loss per one round trip.

Figure 2:
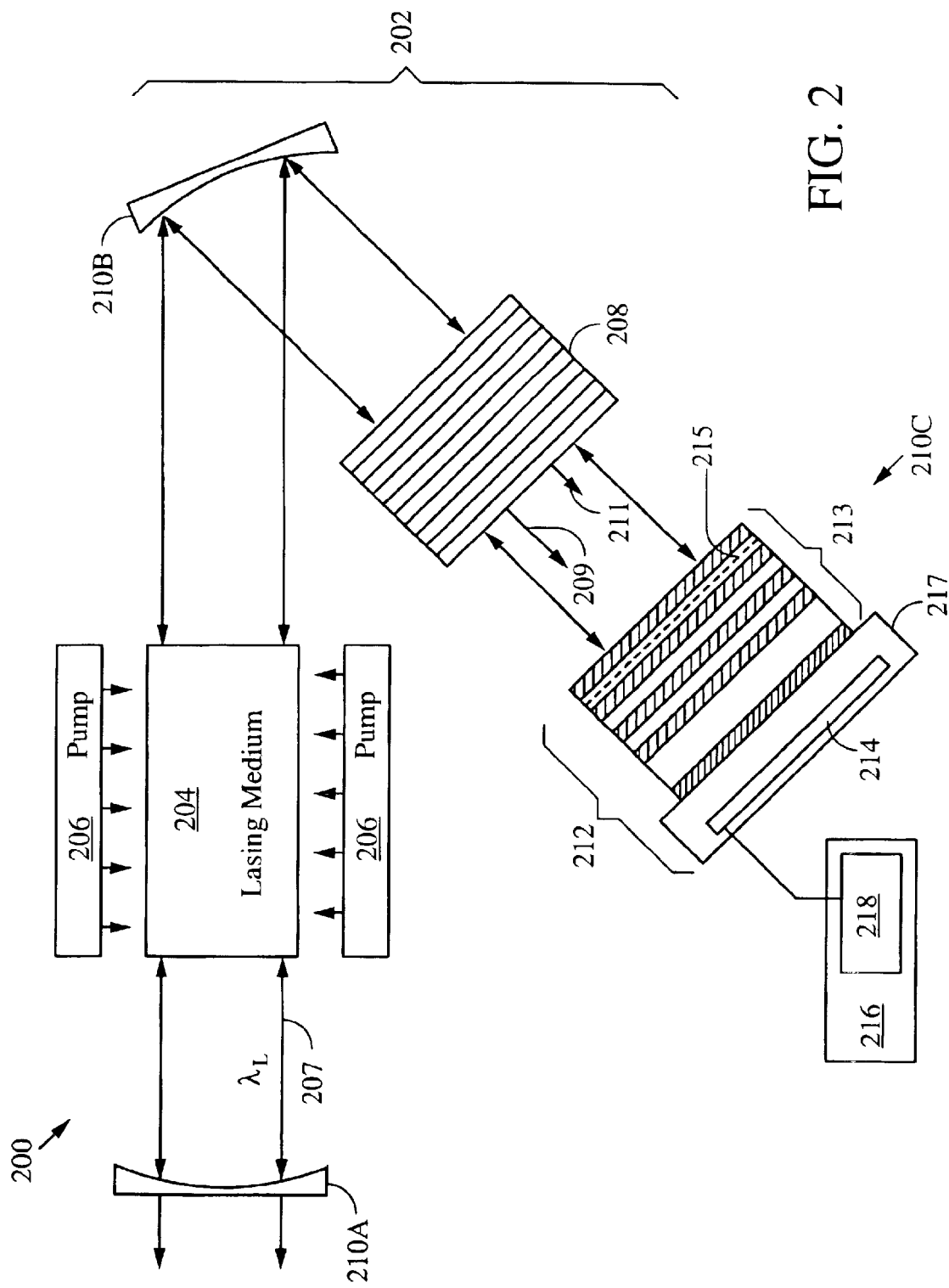
FIG. 2 depicts laser according to a second embodiment of the present invention.
Figure 4:
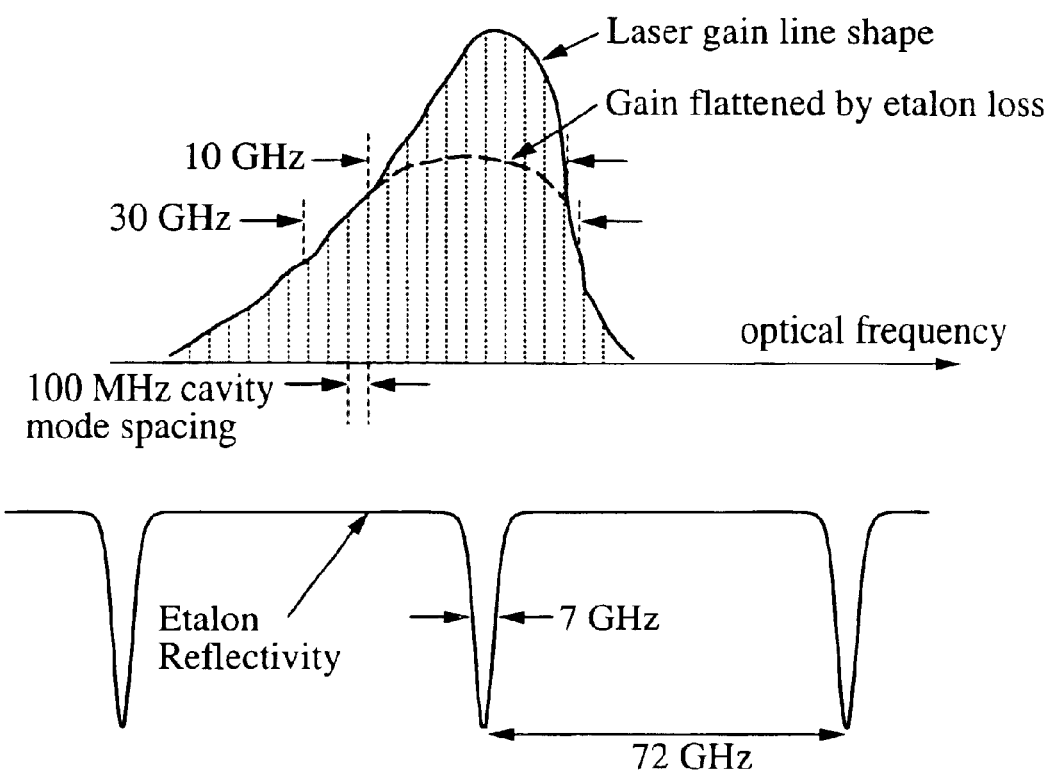
FIG. 4. Depicts a sketch of laser gain line shape juxtaposed with the etalon reflectivity spectrum (not to scale) for a mode-locked laser of the type shown in FIG. 2.

FIG. 4 depicts a sketch of laser gain line shape juxtaposed with the etalon reflectivity spectrum (not to scale) for a mode-locked laser of the type shown in FIG. 2. The values shown represent the parameters of our experimental realization. By aligning an etalon reflectivity minimum with the gain peak, the peak is suppressed and the laser gain line shape is flattened. The decrease in reflectivity of the etalon on resonance increases the loss to the laser cavity. If this point of higher loss is aligned with a peak in the laser gain, then the gain profile is flattened, as shown in FIG. 4, by comparing the solid and dashed lines representing the laser gain profile. The laser gain line shape shown in this figure is a representative sketch, not necessarily an actual line shape for any particular laser. The asymmetry such as shown here is suggested by line shapes observed with a scanning Fabry-Perot interferometer (see FIGS. 6A–6B).

Figure 3:
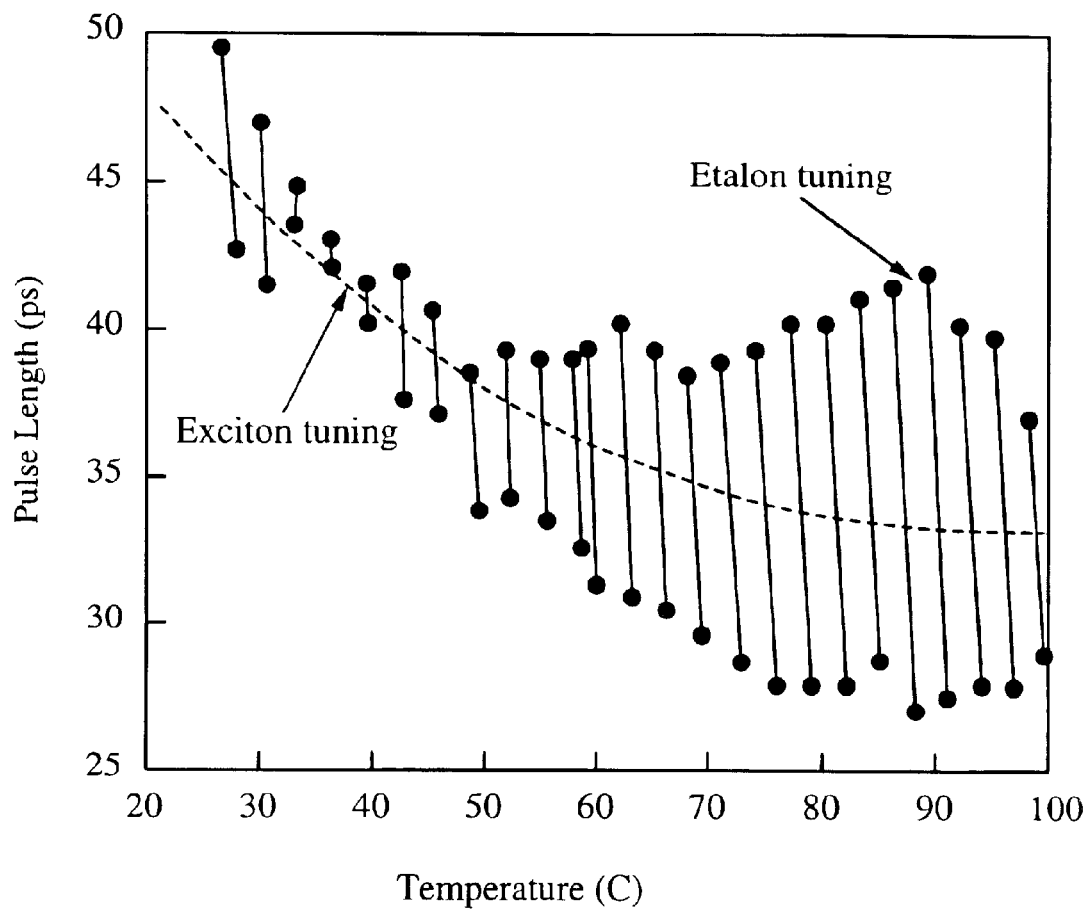
FIG. 3 Depicts a graph of measured pulse length vs. temperature in a mode-locked laser using a monolithic etalon-enhanced saturable Bragg reflector of the type shown in FIG. 2.

The above described device used temperature to control the etalon resonance. Temperature tuning of SBRs is known in the prior art. However, in the prior art, temperature tuning is used to control the exciton absorption peak relative to the gain peak of the laser medium which is a different effect than etalon tuning. Changing the exciton absorption peak by temperature affects the onset of mode-locking and to some extent affects the pulse width. We see this effect in our device also, typically causing shortening of the pulse by ~5%/10° C. as shown in FIG. 3. The effect of temperature change on the etalon produces further shortening of the pulse length and it has a faster tuning rate compared to that of exciton peak tuning, typically ~20%/1° C. as also seen in FIG. 3. The gradual decrease in the average pulse width (shown by the dashed line) is due to exciton tuning with an initial rate of approximately ~5%/10° C. The steep decrease occurring every 3° C. interval is due to etalon tuning, at a rate of approximately −20%/1° C. The pulse length change due to etalon tuning shows up as a modulation under the envelope of the tuning of the exciton absorption peak. Because the tuning rate of the etalon is so much greater than that of the exciton absorption, they are clearly distinct and separate effects.

Figure 5:
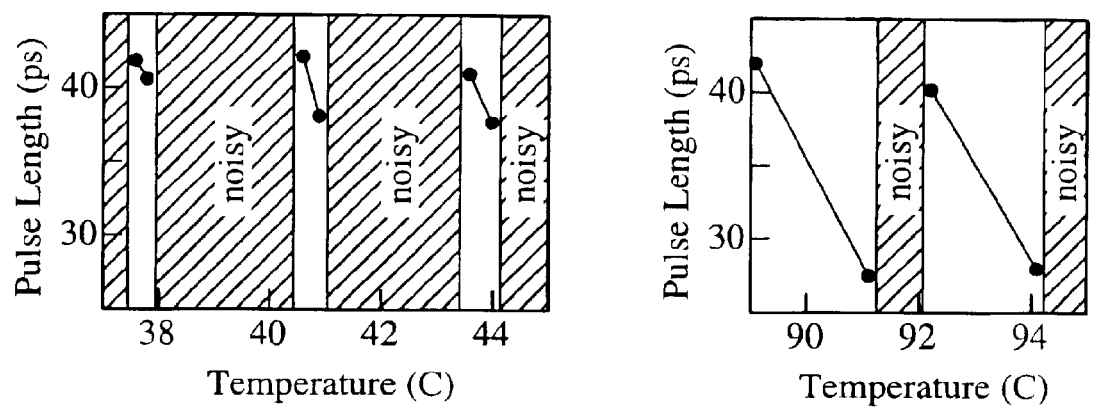
FIG. 5 depicts detailed views of the graph of FIG. 3 over two different temperature ranges.

FIG. 5 shows a detail of two portions of FIG. 3. The etalon resonance is characterized by regions of a stable, clean pulse separated by regions of a noisy pulse. In the stable regions, pulse shortening occurs as the etalon peak moves across the gain line shape when the temperature changes. In this experiment, the regions of stable operation are wider at higher temperatures. The pulse behavior as a function of temperature shows that the etalon tuning behavior is observed in a regime where the pulse is clean and well-formed, which is bracketed by a region in which the pulse is noisy. Note that the temperature range for the stable, clean pulse increases at higher temperature under these particular experimental conditions. Since the sensitivity of pulse width change vs. temperature change is approximately constant within the resonance regions, operating at higher temperature gives greater tolerance for pulse stability. The slope of 2% for 0.1° C. temperature change within the etalon resonance makes the device relatively straightforward to stabilize with available temperature controllers. Thus a typical concern about the difficulty of stabilizing an etalon in a laser cavity is a manageable issue for our device in practical operation.

Figure 6A:
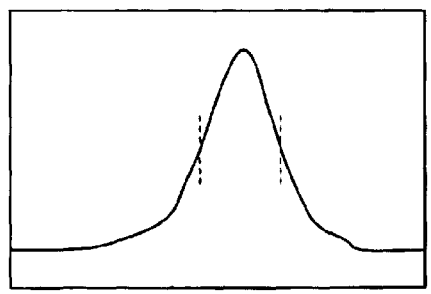
FIG. 6A depicts autocorrelation and optical spectrum traces for an SBR operated with etalon enhancement.
Figure 6A:
Figure 6B:
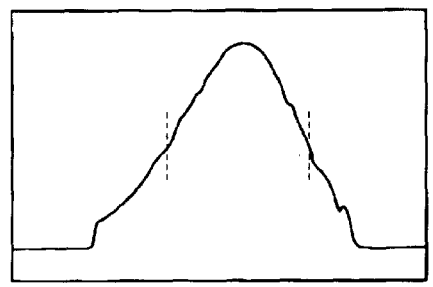
FIG. 6B depicts autocorrelation and optical spectrum traces for the SBR of FIG. 6A operated with its back surface sanded to remove the etalon enhancement.
Figure 6B:
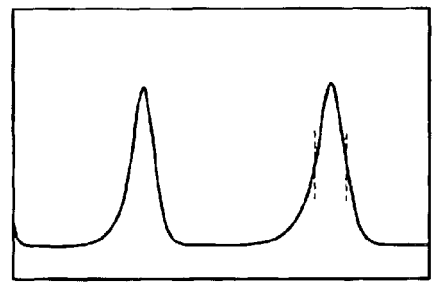

FIGS. 6A–6B depict the effect of removing the etalon enhancement by operating the device with a sanded back surface to eliminate the etalon resonance. In that condition, (i.e., FIG. 6B) the pulse width was typically 2 times longer than when we used etalon enhancement (i.e. FIG. 6A) for otherwise identical laser conditions. Using etalon enhancement, we found that the best pulse width for this device and the parameters that we investigated was 29 ps at 99.7° C.

Thus, an etalon-tunable mode-locked laser may be produced by suitable modification of one or more surfaces of an SBR substrate and tuning the thickness of the substrate. The etalon tuning capability is obtained at a nominal cost without adding to the complexity of the laser. Embodiments of the present invention allow passively mode-locked lasers to produce shorter pulses without introducing more components. The monolithic approach avoids the insertion of additional loss into the laser cavity which would degrade the laser output power. The device has cost advantages in that it is made with only a few simple additions to the basic passive mode locker, which costs less then a discrete implementation. Advantages in manufacturability are the parts count is lower with a monolithic implementation, and there are fewer surfaces that can be damaged. The temperature control of this etalon is simpler than a discrete implementation because the entire face can be mounted in a temperature-controlled surface since the device is used in reflection rather than transmission.

Mode-locked lasers are important for efficient frequency conversion and other applications requiring high peak power or short pulses. Applications for sources using efficient frequency conversion include laser-based displays using red, green, and blue lasers, photoresist exposure and defect identification for printed circuit board and LCD flat panel fabrication using UV sources, semiconductor wafer inspection using UV sources, and infrared countermeasures. Applications for short pulse and high peak power sources include machining, semiconductor test and measurement, photodynamic therapy, two-photon imaging, and electro optical sampling. Most of these applications benefit from shorter pulses which are provided by enhancement of the passive mode-locker with an integrated etalon. Alternatively longer pulses can also be created if needed for specific applications.

It will be clear to one skilled in the art that the above embodiment may be altered in many ways without departing from the scope of the invention. Accordingly, the scope of the invention should be determined by the following claims and their legal equivalents.

What is claimed is:

1. A saturable reflector apparatus comprising:
   a) a substrate comprising a modified surface and a second surface, wherein said modified surface and said second surface form two opposing surfaces in an etalon, wherein said etalon has a finesse greater than about 10; and
   b) a reflector deposited on said second surface of said substrate, wherein said reflector includes a saturable absorber layer, whereby said saturable absorber layer is not disposed between said modified surface and said second surface.

2. The apparatus of claim 1 wherein the modified surface has been polished.

3. The apparatus of claim 1 wherein the modified surface includes a coating.

4. The apparatus of claim 3 wherein the coating includes a metallic or a dielectric material.

5. The apparatus of claim 1 further comprising means for tuning the etalon.

6. The apparatus of claim 5 wherein the tuning means comprise means for adjusting an optical thickness between the two opposing surfaces.

7. The apparatus of claim 6 wherein the adjusting means comprises a heat transfer element thermally coupled to the substrate via said modified surface, wherein the heat transfer element is chosen from the group consisting of heater elements and cooling elements.

8. The apparatus of claim 7 further comprising a temperature controller coupled to the heat transfer element.

9. The apparatus of claim 1 wherein the reflector includes a Bragg stack.

10. The apparatus of claim 1 wherein the reflector includes a metal or dielectric film.

11. The apparatus of claim 1 wherein the substrate is between about 100 microns and 1000 microns thick.

12. A method for modifying a gain spectrum of a laser comprising the steps of:
   a) providing a substrate having a modified surface and a second surface, wherein said modified surface and said second surface form two opposing surfaces in an etalon; and
   b) providing a reflector deposited on the second surface of the substrate, wherein the reflector includes a saturable absorber layer whereby said saturable absorber layer is not disposed between said modified surface and said second surface, wherein radiation within said laser is reflected by said reflector, wherein said gain spectrum of said laser is modified by said etalon.

13. The method of claim 12 wherein the modified surface comprises a surface polished to within a quarter wavelength of light that will be used with the saturable reflector.

14. The method of claim 12 wherein the modified surface comprises a reflective coating.

15. The method of claim 14 wherein the coating includes a metallic or a dielectric material.

16. The method of claim 12 further comprising the step of tuning the etalon.

17. The method of claim 16 wherein the tuning step comprises adjusting an optical thickness between the modified surface and the second surface of the substrate.

18. The method of claim 17 wherein the thickness is adjusted by controlling a temperature of the substrate.

19. The method of claim 18 wherein the tuning adjusts a length of an optical pulse circulating within said laser.

20. The method of claim 12 wherein said etalon has a finesse greater than about 10.

21. A laser comprising:
   a) an optical cavity;
   b) a lasing medium disposed within the optical cavity;
   c) a pump configured to provide pump radiation to the lasing medium; and
   d) a saturable reflector optically coupled to the cavity, wherein the saturable reflector includes
      i) a substrate comprising a modified surface and a second surface, wherein said modified surface and said second surface form two opposing surfaces in an etalon, wherein said etalon has a finesse greater than about 10; and
      ii) a reflector deposited on said second surface of said substrate, wherein said reflector includes a saturable absorber layer, whereby said saturable absorber layer is not disposed between said modified surface and said second surface.

22. The laser of claim 21 further comprising a non-linear medium disposed within the cavity.

23. The laser of claim 22 wherein the nonlinear medium is a crystal containing a material chosen from the group consisting of Lithium Niobate (LiNbO$_3$), Lithium Tantalate (LiTaO$_3$), Lithium Borate (LiBO$_3$), periodically poled lithium niobate (PPLN), periodically poled lithium tantalate (PPLT), MgO:PPLN, KTP, PPKTP, RTA, BBO, MgO:LN, KTA, and PPRTA.

24. The laser of claim 21 wherein the modified surface is a polished surface.

25. The laser of claim 21 wherein the modified surface comprises a coating.

26. The laser of claim 25 wherein the coating includes a metallic or a dielectric material.

27. The laser of claim 21 further comprising means for tuning the etalon.

28. The laser of claim 27 wherein the tuning means comprises means for adjusting an optical thickness between said modified surface and said second surface of the substrate.

29. The laser of claim 28 wherein the adjusting means comprises a heater element thermally coupled to the substrate.

30. The laser of claim 29 further comprising a temperature controller coupled to the heater element.

31. The laser of claim 21 wherein the substrate has a thickness large enough such that the etalon has a free spectral range of the same order as a linewidth of the laser.

32. The laser of claim 31 wherein the free spectral range is on the order of 1 GHz.

33. The laser of claim 21 wherein the reflector is a Bragg stack.

34. The laser of claim 21 wherein the reflector includes a metallic or dielectric film.

35. The laser of claim 21 wherein the substrate has a thickness between about 100 microns and 1000 microns.

* * * * *